United States Patent
DeMerchant et al.

(10) Patent No.: US 8,918,272 B2
(45) Date of Patent: Dec. 23, 2014

(54) METHOD AND APPARATUS FOR FINDING A LOST VEHICLE

(71) Applicant: Sony Corporation, Tokyo (JP)

(72) Inventors: Marvin DeMerchant, San Diego, CA (US); David Andrew Young, San Diego, CA (US); Norifumi Takaya, San Diego, CA (US); David Thiele, San Diego, CA (US); Steven Friedlander, San Diego, CA (US)

(73) Assignee: Sony Corporation, Tokyo (JP)

( * ) Notice: Subject to any disclaimer, the term of this patent is extended or adjusted under 35 U.S.C. 154(b) by 14 days.

(21) Appl. No.: 13/893,724

(22) Filed: May 14, 2013

(65) Prior Publication Data

US 2014/0343834 A1    Nov. 20, 2014

(51) Int. Cl.
| | |
|---|---|
| G05D 1/02 | (2006.01) |
| G01C 21/00 | (2006.01) |
| G01S 5/00 | (2006.01) |
| H04W 64/00 | (2009.01) |
| G07C 5/00 | (2006.01) |

(52) U.S. Cl.
CPC .............. *G01C 21/00* (2013.01); *H04W 64/00* (2013.01); *G01S 5/0027* (2013.01); *H04M 2242/30* (2013.01); *G07C 5/008* (2013.01)
USPC ........... 701/300; 701/31.4; 701/484; 340/438

(58) Field of Classification Search
CPC ................. B60R 2025/1016; B60R 2325/205; B60R 25/33; G01S 5/0027; G07C 5/008; H04M 2242/30; H04W 64/00
USPC ......... 701/31.4, 300, 482, 484, 522; 340/438, 340/439
See application file for complete search history.

(56) References Cited

U.S. PATENT DOCUMENTS

| | | | |
|---|---|---|---|
| 6,246,376 B1 | 6/2001 | Bork et al. | |
| 8,521,419 B2 | 8/2013 | Korn et al. | |
| 2008/0113672 A1* | 5/2008 | Karr et al. | ................. 455/456.1 |
| 2011/0018759 A1 | 1/2011 | Bennett et al. | |
| 2011/0130916 A1* | 6/2011 | Mayer | ............................. 701/33 |
| 2013/0211623 A1 | 8/2013 | Thompson et al. | |

FOREIGN PATENT DOCUMENTS

WO        02/068909        9/2002

OTHER PUBLICATIONS

"Blue Tooth Locator" web site printout http://www.bluetoothlocator.com/, printed Oct. 12, 2011.

\* cited by examiner

*Primary Examiner* — Gertrude Arthur Jeanglaude
(74) *Attorney, Agent, or Firm* — John L. Rogitz

(57) ABSTRACT

When a driver leaves a vehicle as indicated by a separation event such as the driver's portable wireless communication device (WCD) losing Bluetooth connectivity with the vehicle, the WCD uploads to a cloud server its GPS location before the driver has been able to walk away from the vehicle an appreciable distance. The location is recorded and the driver subsequently can use its WCD to communicate with the server to obtain map information showing the current location of the WCD and the location recorded at the separation event, so that the driver knows the location of her vehicle relative to her current location.

20 Claims, 3 Drawing Sheets

METHOD AND APPARATUS FOR FINDING A LOST VEHICLE

FIELD OF THE INVENTION

The present application relates generally to finding a vehicle in, for example, a large parking lot when the driver has forgotten where she parked.

BACKGROUND OF THE INVENTION

Forgetting where one parked in a large parking lot such as at a sports stadium or shopping mall can be frustrating, not to say unsafe. Relying on special purpose beacon locators requires people to remember to carry along special purpose items they ordinarily do not use. As understood herein, it is common practice for people to always take their portable wireless communication device with them virtually everywhere.

SUMMARY OF THE INVENTION

An apparatus includes a computer readable storage medium that is not a carrier wave and that is accessible to a client processor of a client device and bearing instructions which when executed by the client processor configure the processor to execute logic to execute a method that includes establishing communication with a vehicle processor different from the client processor. The method executed by the client processor also includes recording a location representative of a location of the vehicle responsive to a separation event between the client processor and vehicle processor, and responsive to a user command to present location information of the vehicle, presenting on the client device associated with the client processor a map and/or instructions indicating a location of the vehicle relative to a location of the client device based on the location of the vehicle that was recorded responsive to the separation event.

The separation event can be loss of communication with the vehicle by the client device, such as loss of Bluetooth or WiFi communication with the vehicle. Or, the separation event can be motion of the client device satisfying a motion threshold for a time period satisfying a time threshold. If desired, the location of the client device that is presented on the map and/or instructions indicating a location of the vehicle relative may be derived from a GPS sensor in the client device. Or, the location of the client device that is presented on the map and/or instructions indicating a location of the vehicle relative may be derived from a non-GPS motion sensor in the client device or from WiFi location information.

In another aspect, an apparatus includes a computer readable storage medium that is not a carrier wave and that is accessible to a client processor of a client device and bearing instructions which when executed by the client processor configure the processor to execute logic to execute a method that includes automatically detecting a separation event of the client device from a vehicle. Responsive to automatically detecting the separation event, a location of the vehicle and/or a location of the client device is recorded to establish a recorded location. The method includes presenting on the client device a user interface (UI) presenting a map showing a current location of the client device and the recorded location indicating a location of a vehicle.

In another aspect, a method includes, upon a wireless communication device (WCD) leaving a vehicle, automatically recording a location as a location of the vehicle. Subsequently upon command input by a user of the WCD, a current location of the WCD and the location of the vehicle is shown on the WCD, so that the driver knows the location of her vehicle relative to her current location.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
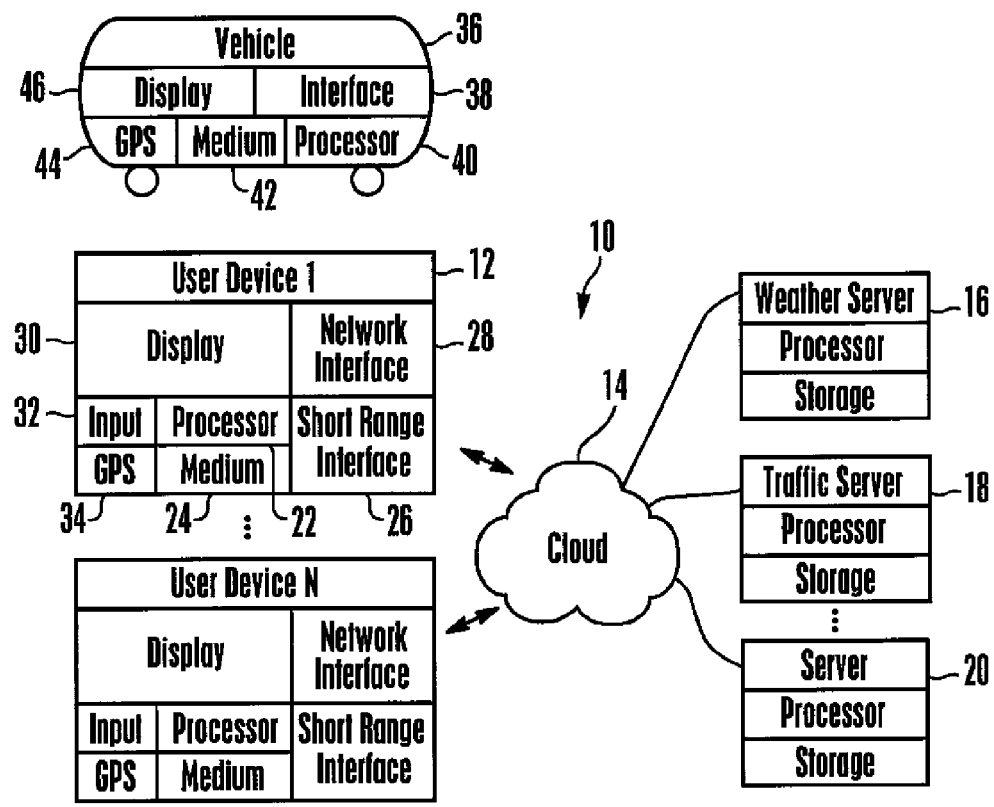
FIG. 1 is a block diagram of an example system according to present principles.

Disclosed are methods, apparatus, and systems for computer based user information. A system herein may include server and client components, connected over a network such that data may be exchanged between the client and server components. The client components may include one or more computing devices. These may include personal computers, laptops, tablet computers, and other mobile devices including smart phones. These client devices may operate with a variety of operating environments. For example, some of the client computers may be running Microsoft Windows® operating system. Other client devices may be running one or more derivatives of the Unix operating system, or operating systems produced by Apple® Computer, such as the MS® operating system, or the Android® operating system, produced by Google®. While examples of client device configurations are provided, these are only examples and are not meant to be limiting. These operating environments may also include one or more browsing programs, such as Microsoft Internet Explorer®, Firefox, Google Chrome®, or one of the other many browser programs known in the art. The browsing programs on the client devices may be used to access web applications hosted by the server components discussed below.

Server components may include one or more computer servers executing instructions that configure the servers to receive and transmit data over the network. For example, in some implementations, the client and server components may be connected over the Internet. In other implementations, the client and server components may be connected over a local intranet, such as an intranet within a school or a school district. In other implementations a virtual private network may be implemented between the client components and the server components. This virtual private network may then also be implemented over the internet or an intranet.

The data produced by the servers may be received by the client devices discussed above. The client devices may also generate network data that is received by the servers. The server components may also include load balancers, firewalls, caches, and proxies, and other network infrastructure known in the art for implementing a reliable and secure web site infrastructure. One or more server components may form an apparatus that implement methods of providing a secure community to one or more members. The methods may be implemented by software instructions executing on processors included in the server components. These methods may utilize one or more of the user interface examples provided below in the appendix.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system. A processor may be any conventional general purpose single- or multi-chip processor such as the AMD® Athlon® II or Phenom® II processor, Intel® i3®/i5®/i7® processors, Intel Xeon® processor, or any implementation of an ARM® processor. In addition, the processor may be any conventional special purpose processor, including OMAP processors, Qualcomm® processors such as Snapdragon®, or a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. The description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be written in any conventional programming language such as C#, C, C++, BASIC, Pascal, or Java, and run under a conventional operating system. C#, C, C++, BASIC, Pascal, Java, and FORTRAN are industry standard programming languages for which many commercial compilers can be used to create executable code. The system may also be written using interpreted languages such as Pert Python or Ruby. These are examples only and not intended to be limiting.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one or more example embodiments, the functions and methods described may be implemented in hardware, software, or firmware executed on a processor, or any combination thereof. If implemented in software, the functions may be stored on or transmitted over as one or more instructions or code on a, computer-readable medium. Computer-readable media include both computer storage media and communication media including any medium that facilitates transfer of a computer program from one place to another. However, a computer readable storage medium is not a carrier wave, and may be any available media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.) It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

Referring initially to FIG. 1, a system 10 includes at least one and in the example shown "N" user or client devices 12 communicating via a computer cloud 14 such as the Internet with one or more server computers. In the example shown, a weather server 16, a traffic server 18, and in general one or more servers 20 communicate with the client device 12 through the cloud.

Among the non-limiting and example components a client device 12 may incorporate, a processor 22 accesses a computer readable storage medium 24 that contains instructions which when executed by the processor configure the processor to undertake principles disclosed below. The client device 12 may communicate with other client devices using a wireless short range communication interface 26 such as but not limited to a Bluetooth transceiver controlled by the processor 22. Also the client device 12 may communicate with the cloud 14 using a wireless network interface 28 such as but not limited to one or more of a WiFi transceiver, wireless modem, wireless telephony transceiver, etc. controlled by the processor 22. Wired interfaces 26, 28 are also contemplated.

The client device typically includes a visual display 30 such as a liquid crystal display (LCD) or light emitting diode (LED) display or other type of display controlled by the processor 22 to present demanded images. The display 30 may be a touch screen display. In addition, one or more input devices 32 may be provided for inputting user commands to the processor 22. Example input devices include keypads and keyboards, point-and-click devices, a microphone inputting voice commands to a voice recognition engine executed by the processor 22, etc. A position sensor 34 may input signals to the processor 22 representing a location of the client device 12. While FIG. 1 assumes that the position receiver 34 is a global positioning satellite (GPS) receiver, other position sensors may be used in addition or in lieu of a GPS receiver. For example, a motion sensor 35 such as an accelerometer, gyroscope, magnetic sensor, and the like may be used to input position information to the processor 22. Location information may also be derived from WiFi information, e.g., the location of the client device may be inferred to be the location of a WiFi hotspot in which the device is communicating.

FIG. 1 also shows that a person carrying the client device 12 may decide to enter a vehicle 36. The vehicle 36 may include a communication interface 38 controlled by a vehicle processor 40 accessing a computer readable storage medium 42. The interface 38 may be configured to communicate with one of the interfaces of the client device 12 and may be a Bluetooth transceiver. The vehicle 36 may include an onboard GPS receiver 44 or other position receiver sending signals to the processor 40 representing the location of the vehicle 36. The vehicle processor 40 may control a visual display 46 in the vehicle to, e.g., present an electronic map thereon and other user interfaces. Other client devices may be transported by their users into other vehicles and establish communication with the processors of the other vehicles.

Figure 2:
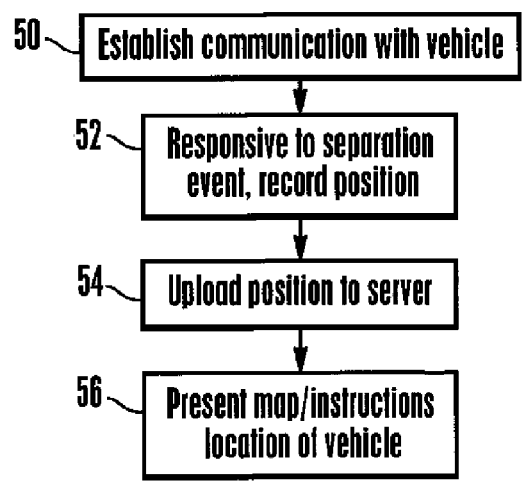
FIG. 2 is a flow chart showing example overall logic.

As understood herein, when the person using a device 12, which can be regarded as a wireless communication device (WCD), leaves the vehicle parked in a location such as a large parking lot or wilderness hiking area or other location that the person may have difficulty remembering exactly where she left her vehicle, the logic of FIG. 2 may be executed. Typically the WCD 12 establishes wireless communication at block 50 with the vehicle processor 40, often through Bluetooth pairing using the short range interface 26 or using a WiFi pairing.

Proceeding to block 52, responsive to separation event between the WCD 12 and vehicle 36, a location is recorded which represents the location of the vehicle. In some implementations the location is recorded automatically in response to the separation event. In other implementations the location is recorded responsive to a user command to record it. Further details of user commands to record the location are discussed below.

The location that is recorded can be the location of the WCD 12 as indicated by its GPS receiver 34. In this case, the WCD 12 senses the separation event. The location can be recorded in the WCD storage medium 24. If desired, the location can be uploaded to a server such as the server 20 at block 54. It will be appreciated that by recording the location of the WCD 12, e.g., upon loss of Bluetooth communication, the location is recorded before the driver has been able to walk away from the vehicle an appreciable distance. Thus the recorded location, although that of the WCD 12, can then be used effectively later as a proxy for the location of the vehicle to aid the user of the WCD 12 in finding the vehicle.

Or, the location that is recorded can be the location of the vehicle 36 as indicated by the vehicle GPS receiver 44. In this case the vehicle processor senses the separation event and can upload the location to the server 20, which if desired can download it immediately or upon command to the client processor 22.

The separation event may be loss of short range wireless communication such as loss of Bluetooth communication between the WCD 12 and vehicle 36. Or, the separation event may be loss of WiFi connectivity with the vehicle. Yet gain, the separation event can be motion of the WCD 12 satisfying a motion threshold for a time period satisfying a time threshold. The motion of the WCD 12 may be velocity derived from the motion sensor 35 or successive positions sensed by the GPS receiver 34. For instance, if the WCD 12 has not moved at a velocity greater than a few miles per hour for a period of at least one or two minutes (typically longer than most traffic stops), the WCD processor 22 can infer that the user of the WCD has left the vehicle. Or, a sensed WCD velocity greater than zero but less than, e.g., ten miles per hour for a period of, e.g., thirty seconds or more can be inferred to indicate that the person has left the vehicle with the WCD and is walking away from the vehicle.

Access to vehicle data may also be used to establish or indicate the separation event. Examples of this include ignition key being turned off, transmission position (e.g., placed in park mode), etc. Such events may be communicated from the vehicle to the WCD 12.

Suppose the user of the WCD 12 has left the vehicle and now wishes to return to the vehicle, but cannot recall precisely where she parked it. Accordingly, at block 56, typically responsive to a user command to present the location information of the vehicle, a map and/or instructions are presented on the WCD 12 on the display 30 and/or audibly indicating the location of the vehicle relative that was recorded upon the separation event, relative to the current location of the client device as indicated by, e.g., the WCD GPS receiver 34 or motion tracking based on signals from the motion sensor 35. The map information may be obtained from the server 20 or from local memory. When maintained onboard the WCD 12 the map information requires only the provision of the current location of the WCD 12 from, e.g., a motion sensor 35 or from the GPS receiver. This means that even if in a wilderness area the user can locate the vehicle since the processor tracking WCD location using signals from the motion sensor 35 does not require network connectivity, and reception from GPS satellites also requires no network connectivity but only communication with an overhead orbiting satellite.

Figure 3:
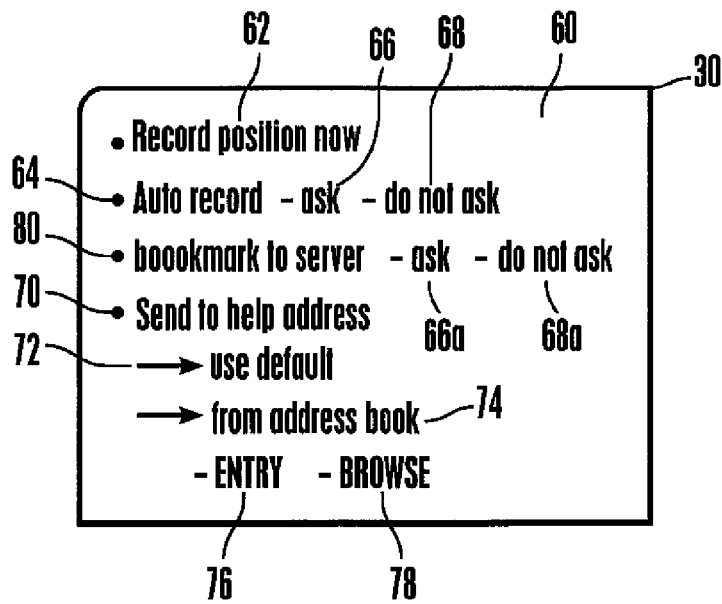
FIG. 3 is a screen shot showing a user interface (UI) for setting up separation event auto-record functions and for manually recording the location of the wireless communication device (WCD) to be used as proxy for vehicle location.

FIG. 3 shows an example user interface (UI) 60 that can be presented on the display 30 of the WCD 12 to set up operation or manually record a location, with the manual recordation establishing the separation event albeit not an automatic one. The user can select the selector 62 to record the current location of the WCD 12 as the location of the vehicle 36 to be used in presenting the map shown in FIG. 8 discussed further below. The user can also select to automatically record WCD location as the vehicle location upon subsequent separation events by selecting the auto record selector 64. As indicated, the user can also select (66) whether to be asked prior to recording responsive to a separation event, which if selected results in the UI of FIG. 4 to be presented upon detecting a separation event, or to select (68) not to be asked prior to recording responsive to a separation event, which if selected results in the UI of FIG. 5 or 6 to be presented upon detecting a separation event.

Also, the user may elect to select (70) to send the location recorded as the vehicle location to a help address, either a default (72) help service address such as a web address or an address selected (74) from an address book of the WCD 12. The user can input (76) an entry from the address or browse (78) the address book for an entry. Moreover, a user can select a selector 80 to bookmark, i.e., upload, the location to be used as the vehicle location to a server, and can select (66a) whether to be asked or not asked (68A) prior to such uploading.

Figure 4:
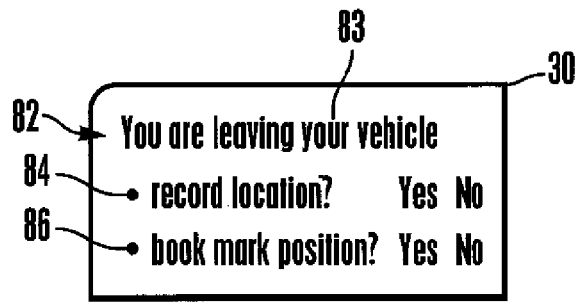
FIG. 4 is a screen shot showing a UI in which a separation event has been automatically detected but location is not recorded until a user commands it to be.

FIG. 4 shows that upon detection of a separation event other than manual recording selection by means of the selector 62 in FIG. 3, and assuming the user has selected (66) to be asked to record the location and has also selected (66A) to be asked to upload the location to a server, a UI 82 is presented. As shown, the UI 82 includes a message 83 that the user is leaving the vehicle as indicated by automatic detection of a separation event. The user is also asked at 84 whether to record the current location of the WCD 12 as the vehicle location (yes/no). The user is also asked at 86 whether to send the current location of the WCD 12 to the server as the vehicle location (yes/no).

Figure 5:
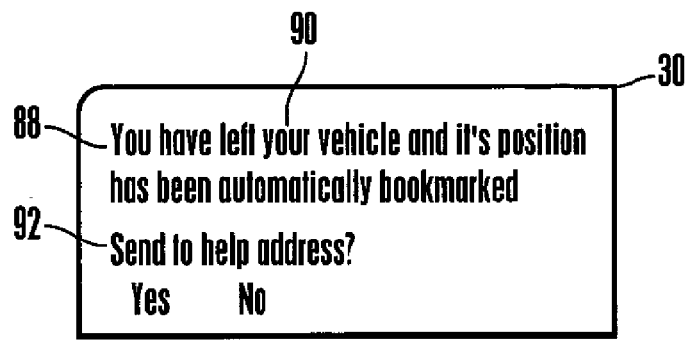
FIG. 5 is a screen shot showing a UI in which a separation event has been automatically detected and location has been automatically recorded by the WCD, showing a prompt to decide whether to also send the recorded location to a help address.

FIG. 5 shows that upon detection of a separation event other than manual recording selection by means of the selector 62 in FIG. 3, and assuming the user has selected (68) not to be asked to record the location but has also selected (66A) to be asked to upload the location to a server, a UI 88 is presented. As shown, the UI 88 includes a message 90 that the user is leaving the vehicle as indicated by automatic detection of a separation event, and that the current location of the WCD 12 has been recorded as the vehicle location (yes/no). The user is also asked at 92 whether to send the current location of the WCD 12 to the server as the vehicle location (yes/no).

Figure 6:
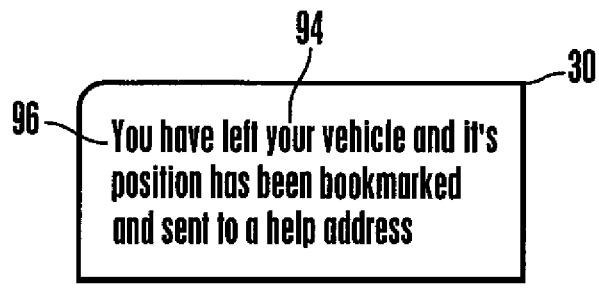
FIG. 6 is a screen shot showing a UI informing the user that a separation event has been automatically detected, and location recorded and uploaded to a help address.

FIG. 6 shows that upon detection of a separation event other than manual recording selection by means of the selector 62 in FIG. 3, and assuming the user has selected (68) not to be asked to record the location and has also selected (68A) not to be asked to upload the location to a server, a UI 94 is presented. As shown, the UI 94 includes a message 96 that the user is leaving the vehicle as indicated by automatic detection of a separation event, and that the current location of the WCD 12 has been recorded as the vehicle location (yes/no). The message 96 also indicates that the current location of the WCD 12 has been sent to the server as the vehicle location.

Note that the form and content of the above messages are examples and not otherwise limiting unless appearing in a claim intended to be so limited, and then only upon the terms of the claim itself.

Assume that the user subsequently discovers that she cannot remember where she parked her vehicle. The UI 100 of FIG. 7 may be invoked. The user can select a find selector 102 to cause the UI of FIG. 8 to appear. The user can also select a help selector 104 in some embodiments to automatically send the current location of the WCD 12 to the help server to which the address and vehicle location were sent, in which case the server provides to the help address the locations of the vehicle and the current location of the WCD 12 to the help address, requesting outside assistance.

Figure 7:
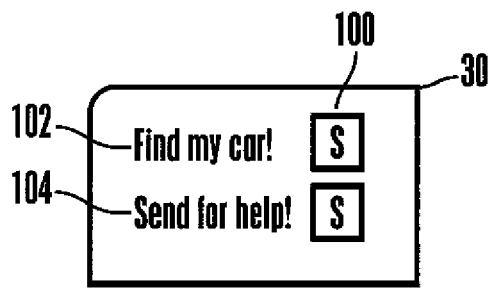
FIG. 7 is a screen shot of a UI enabling a user to invoke a map and/or instructions to her vehicle, and/or to command her current location to be uploaded to the help address for prompting a rescuer to come to her aid.
Figure 8:
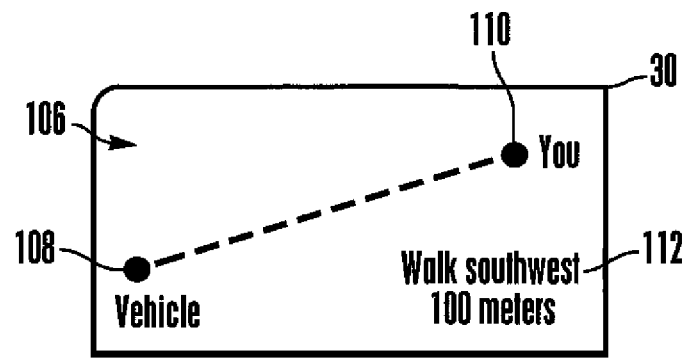
FIG. 8 is a screen shot of a UI showing a map and instructions from a current location to the recorded location used for the vehicle location.

Upon selection of the find selector 102 in FIG. 7, the UI 106 of FIG. 8 appears. The WCD processor retrieves the previously recorded actual or proxy vehicle location 108, either from internal memory 24 or from the server 20, and presents a map on the display 30 showing the current location 110 of the WCD 12 as obtained from, e.g., the GPS receiver 34. A message 112 can also be presented instructing the user which direction to take and how far to travel to be co-located once again with her vehicle. In addition to or in lieu of visual maps and instructions, audio instructions may be provided.

While the particular METHOD AND APPARATUS FOR FINDING A LOST VEHICLE is herein shown and described in detail, it is to be understood that the subject matter which is encompassed by the present invention is limited only by the claims.

What is claimed is:

1. Apparatus comprising:
    at least one computer readable storage medium that is not a carrier wave and that is accessible to a client processor of a client device and bearing instructions which when executed by the client processor configure the processor to execute logic to execute a method comprising:
    establishing communication with a vehicle processor different from the client processor;
    recording a location representative of a location of the vehicle responsive to a separation event between the client processor and vehicle processor;
        responsive to a user command to present location information of the vehicle, presenting on the client device associated with the client processor a map and/or instructions indicating a location of the vehicle relative to a location of the client device based on the location of the vehicle that was recorded responsive to the separation event.

2. The apparatus of claim 1, wherein the separation event is loss of communication with the vehicle.

3. The apparatus of claim 1, wherein the separation event is loss of WiFi communication with the vehicle.

4. The apparatus of claim 1, wherein the separation event is loss of Bluetooth communication with the vehicle.

5. The apparatus of claim 1, wherein the separation event is motion of the client device satisfying a motion threshold for a time period satisfying a time threshold.

6. The apparatus of claim 1, wherein the location of the vehicle that was recorded responsive to the separation event is a global positioning satellite (GPS) location.

7. The apparatus of claim 1, wherein the location of the client device that is presented on the map and/or instructions indicating a location of the vehicle relative is derived from a GPS sensor in the client device.

8. The apparatus of claim 1, wherein the location of the client device that is presented on the map and/or instructions indicating a location of the vehicle relative is derived from a non-GPS motion sensor in the client device.

9. The apparatus of claim 1, wherein the location of the client device that is presented on the map and/or instructions indicating a location of the vehicle relative is derived from WiFi location information.

10. Apparatus comprising:
    at least one computer readable storage medium that is not a carrier wave and that is accessible to a client processor of a client device and bearing instructions which when executed by the client processor configure the processor to execute a method comprising:
    automatically detecting a separation event of the client device from a vehicle;
    responsive to automatically detecting the separation event, recording a location of the vehicle and/or a location of the client device to establish a recorded location; and
    presenting on the client device a user interface (UI) presenting a map showing a current location of the client device and the recorded location indicating a location of a vehicle.

11. The apparatus of claim 10, wherein the recorded location is a location of the client and is used as a proxy for the location of the vehicle.

12. The apparatus of claim 10, wherein the recorded location is a location of the vehicle as obtained from a vehicle GPS receiver.

13. The apparatus of claim 10, wherein the method executed by the client processor when accessing the instructions further includes, prior to recording the location of the vehicle and/or location of the client to establish the recorded location and responsive to automatically detecting the separation event, asking a user whether to record the location of the vehicle and/or location of the client.

14. The apparatus of claim 10, wherein the method executed by the client processor when accessing the instructions further includes immediately recording the location of the vehicle and/or location of the client to establish the recorded location responsive to automatically detecting the separation event without asking a user to record the location of the vehicle and/or location of the client.

15. The apparatus of claim 10, wherein the method executed by the client processor when accessing the instructions further includes asking a user of the client device whether to send the recorded location to a server.

16. The apparatus of claim 10, wherein the method executed by the client processor when accessing the instructions further includes immediately sending the recorded location to a server responsive to automatically detecting the separation event without asking a user to send the recorded location to the server.

17. The apparatus of claim 10, wherein the method executed by the client processor when accessing the instructions further includes presenting a selector on the client device selectable to command a server to which the recorded location is sent by the client device to send the recorded location and current location of the client device to a help address for assistance.

18. Method comprising:
    responsive to a determination that a wireless communication device (WCD) has left a vehicle, automatically recording a location as a location of the vehicle;
    subsequently upon command input by a user of the WCD, showing on the WCD a current location of the WCD and the location of the vehicle, so that the driver knows the location of her vehicle relative to her current location.

19. The method of claim 18, wherein the location recorded as a location of the vehicle is a location of the WCD.

20. The method of claim 18, wherein the WCD is automatically determined to have left the vehicle responsive to a loss of communication connectivity between the WCD and the vehicle.

* * * * *